United States Patent
Kranz et al.

(10) Patent No.: US 7,848,634 B2
(45) Date of Patent: Dec. 7, 2010

(54) METHOD AND APPARATUS FOR IDENTIFYING INTERCHANGEABLE LENSES

(75) Inventors: Gerhard Kranz, Wetzlar (DE); Oliver Zielberg, Wetzlar (DE); Robert Denk, Braunfels (DE); Ulrich Lies, Wetzlar (DE)

(73) Assignee: Leica Camera AG, Solms (DE)

( * ) Notice: Subject to any disclaimer, the term of this patent is extended or adjusted under 35 U.S.C. 154(b) by 816 days.

(21) Appl. No.: 11/737,778

(22) Filed: Apr. 20, 2007

(65) Prior Publication Data
US 2008/0304818 A1  Dec. 11, 2008

(30) Foreign Application Priority Data
Apr. 24, 2006 (DE) .................. 10 2006 019 449

(51) Int. Cl.
G03B 17/24 (2006.01)
G03B 1/00 (2006.01)
G03B 17/00 (2006.01)
G02B 7/02 (2006.01)

(52) U.S. Cl. .............. 396/310; 396/406; 396/529; 359/819

(58) Field of Classification Search ............ 396/310
See application file for complete search history.

(56) References Cited

U.S. PATENT DOCUMENTS

| | | | |
|---|---|---|---|
| 4,236,803 A | 12/1980 | Shimomura | 396/298 |
| 4,439,029 A | 3/1984 | Okura et al. | 396/267 |
| 4,541,700 A * | 9/1985 | Bletz et al. | 396/298 |
| 5,049,909 A * | 9/1991 | Ishikawa et al. | 396/406 |
| 5,713,053 A * | 1/1998 | Hirai | 396/92 |
| 6,148,151 A | 11/2000 | Bauer | 396/56 |
| 6,269,222 B1 | 7/2001 | Hartung | 396/301 |
| 6,351,612 B1 * | 2/2002 | Misawa | 396/287 |
| 7,625,144 B2 * | 12/2009 | Kranz et al. | 396/529 |

FOREIGN PATENT DOCUMENTS

| | | |
|---|---|---|
| DE | 34 37 067 A1 | 4/1986 |
| DE | 34 38 322 A1 | 4/1986 |
| DE | 34 43 443 A1 | 5/1986 |
| EP | 0 942 305 A1 | 9/1999 |
| EP | 1 006 397 B1 | 6/2000 |
| JP | 2001-142107 A | 5/2001 |
| JP | 2007-293348 * | 8/2007 |

OTHER PUBLICATIONS

Machine English Translation of JP 2007-293348, Nov. 8, 2007, 30 pages.*

* cited by examiner

*Primary Examiner*—Melissa J Koval
(74) *Attorney, Agent, or Firm*—Foley & Lardner LLP

(57) ABSTRACT

An interchangeable lens connects in a prescribed position to a support surface on a camera of a camera system using a locking apparatus. A method and apparatus for identifying interchangeable lenses uses optical radiation. After the locking operation is performed, a defined optical radiation is directed from two or more, preferably six, light transmitters arranged in the support surface to reflecting or absorbing surfaces on the locking apparatus which are assigned to said light transmitters. The radiation returning from the respective reflecting/absorbing surfaces is picked up by light receivers arranged next to the light transmitters in the support surface. A binary coded signal for identifying the interchangeable lens is formed from the output signals of the light receivers.

6 Claims, 3 Drawing Sheets

METHOD AND APPARATUS FOR IDENTIFYING INTERCHANGEABLE LENSES

BACKGROUND

The invention relates to a method for identifying interchangeable lenses that can be connected with the aid of a locking apparatus in a prescribed position to a support surface on a camera of a camera system, and to an apparatus for carrying out the method.

Methods for exchanging information between interchangeable lenses of a camera system that can be fitted with the aid of a locking apparatus, usually designed as a bayonet connection, onto a support surface on a system camera, for example a mirror reflex camera or a metering viewpoint camera, are known per se in the case of modern camera systems. In the case of older mechanical camera systems, by contrast, the lack of interfaces renders impossible the exchange of information. The interchangeable lenses of modern camera systems generally have electric consumers such as automatic focus and aperture control mechanisms. The bayonet connections therefore frequently have a number of electrical contacts. These electrical contacts are used, on the one hand, to supply power to the electric consumers in the lens and, on the other hand, for methods intended to transmit signals between lens and camera housing. In this way, a bidirectional data transmission from the camera housing to the lens is equally as possible as a data transmission from the lens to the camera. In the case of such methods for exchanging information, both lens setting information, such as the currently set range or working aperture, is transmitted to the camera, and so are basic lens data such as focal length and aperture ratio. If the lens has measurable systematic errors such as, for example, vignetting, coma or backfocus errors, these can be stored in a data memory in the lens and be transmitted to the camera electronics if required for correction purposes. However, such methods fundamentally require a multiplicity of electrical contacts which are frequently arranged tightly next to one another and are susceptible to interference. For example, when a lens is fitted onto the camera housing undesired electrical connections can come about between contacts that are not to be connected to one another. Contacting problems also frequently arise after the camera has not been used for some time.

To avoid these problems, it is known from EP 1 006 397 B1 to separate the signal transmission from the power supply by using optocouplers for contactless bidirectional optical signal transmission. Undesired short circuits between signal connections and power supply connections of the lens and of the camera housing when the lens is fitted in are reliably prevented in this way.

DE 34 38 322 A1 discloses a method for transmitting signal data between the lens and a camera of a camera system. On the camera side, a defined radiation is generated that has at least one of its properties varied in accordance with at least one mechanical manipulated variable, and is then converted into an electric signal that is used to display the manipulated variable and/or to control camera functions. It is possible in this way to transmit lens setting information from the lens to the camera. The defined radiation generated in the camera housing is firstly fed, with the aid of complicated optical means, for pickup and for guidance of the said radiation, to the lens, and subsequently returned to the camera housing. The lens has additional means for this purpose that varies at least one of the properties of the said radiation in accordance with at least one mechanical manipulated variable, and in this way enables the transmission of lens setting information. Means are provided in the camera housing for evaluation with regard to the display of this information and/or the control of camera functions. The arrangement requires a great deal of space and many individual components.

A further device with optical detection of signal data may be gathered from DE 34 43 443 A1. The relative movement between lens mount and camera body in relation to one another that necessarily occurs during fitting of the lens is used in order to be able to detect an optically readable scale in the form of a bar code on the pickup lens. The detection of the bar code is possible only during the fitting operation. Since the reading device must always be operationally ready precisely during the fitting operation, but this instant is not known, it is impossible to rule out malfunctions in the detection of the scale. The detection of a bar code of an already fitted lens, for example after the camera has been switched on, is impossible. The known methods cannot be used in the case of interchangeable lenses of relatively old mechanical camera systems, and existing lenses cannot be converted, or can be converted only with a high, uneconomic outlay.

SUMMARY

It was therefore the object of the invention to provide the camera of a camera system in a simple way with information relating to the connected interchangeable lens, to overcome the problems of contact-related data transmission, and to enable an improvement in the image results on the basis of expanded information relating to the respective interchangeable lens. It is intended in this case that lenses of relatively old design likewise be capable of retrofitting cost-effectively with such a functionality, and at least be capable of further use on relatively new camera systems.

The method according to the invention is defined in that after the locking operation is performed a defined optical radiation is directed from two or more, preferably six light transmitters arranged in the support surface on the camera to reflecting or absorbing surfaces on the locking apparatus which are assigned to said light transmitters. The reflecting and absorbing surfaces are preferably surface regions, constructed as depressions, in the locking apparatus of the interchangeable lens. Constructing the depressions with a white lacquer has proved effective in forming reflecting surfaces, and absorbing surfaces are preferably produced by being constructed with a matt black lacquer. The radiation returning from the respective white reflecting surfaces and black absorbing surfaces is picked up by light receivers arranged next to the light transmitters in the support surface. Subsequently, a binary coded signal for identifying the interchangeable lens is formed from the output signals of the light receivers.

The binary coded signal is advantageously fed to a computer unit of the camera, which assigns the code an interchangeable lens with specific basic data such as focal length and aperture ratio. Information relating to the connected interchangeable lens is made available in this simple way to the camera of a camera system.

If, for example, only the first (reflecting) field on the locking apparatus of the lens reflects the radiation, and all the remaining fields do not reflect the radiation (absorbing surfaces), this corresponds to the binary coded signal 1 and can be used to identify the interchangeable lens 1. It is also possible in this way for lens specific data such as, for example, specific correction values for vignetting, coma or backfocus errors of the identified lens, to be assigned to the interchangeable lens. With six fields, it is thereby possible to implement $2^6$, and thus 64, binary codings which can theoretically be used to identify 64 different interchangeable lenses with their respective individual properties. When evaluating the binary coded signal by means of a computer unit of the camera, it is possible, in particular, to solve compatibility problems with older interchangeable lenses with the aid of the same mechanical locking apparatus. Without being converted, older lenses do not have specific reflecting and absorbing surfaces on their locking apparatus and, because of a generally very good reflection on all surface regions, produce the binary code 64 that can be used in general to identify older, noncoded lenses. In order to confirm such an identification of an older uncoded lens that can be defective owing to soiling of the surface of the locking apparatus, it is advantageous to provide a further sensor, which is independent of the actual identification. This sensor can be optimized for the identification of noncoded lenses. In order to prevent malfunctions of the camera that are caused by the use of lenses foreign to the system, this additional sensor can likewise be used to distinguish between noncoded older lenses of the camera system and lenses foreign to the system. A further case to be taken into account, which does not lead to identifying a lens, is that in which no lens is connected to the camera. It is therefore advantageous to evaluate the binary code 0 (no reflection of the optical radiation) as a disturbance or "no lens present", for example.

In order to prevent crosstalk from one light transmitter to a neighboring light receiver that is, however, not assigned for evaluating purposes to said light transmitter, it is advantageous if the light transmitters are switched on in a cyclically alternating fashion at predetermined time intervals, and the light receivers assigned to them pick up the returning radiation synchronously therewith. This procedure additionally enables power to be spared during identifying.

A particularly reliable and quicker identification is possible by means of parallel evaluation. In order, nevertheless, to prevent the crosstalk mentioned above, a number of non-adjacent pairs of light transmitters and light receivers are evaluated simultaneously during a cycle. The method can consist in simultaneously evaluating the 1st and 4th, then the 2nd and 5th and then the 3rd and 6th pairs of light transmitters and light receivers. However, it is also reliable and quick to evaluate simultaneously the 1st, 3rd and 5th, and subsequently the 2nd, 4th and 6th pairs of light transmitters and light receivers.

In order to prevent spurious light, originating from the light transmitters, in the event of image pickup, it is advantageous to carry out the identification of an interchangeable lens separately in time from an image pickup by the lens.

A particularly good provision of information relating to an interchangeable lens connected to the camera is achieved when the assignment between the binary coded signal and the basic data of the interchangeable lens is permanently stored by the manufacturer in a data memory of the computer unit of the camera. In a particularly advantageous way, additional lens-specific data can be transferred into a variable data memory of the computer unit with the aid of data records provided by the manufacturer. These data records can be determined when producing a specific lens, and are, for example, stored on a separate data carrier that can be inserted into the camera. A particularly easy possibility of transferring these data into the variable data memory consists in reading them from the data carrier inserted into the camera with the aid of a program internal to the camera, and storing them.

In a particularly advantageous way, with the aid of the method a computer-aided image correction or optimization of the image quality is carried out in the event of a digital image pickup taking account of the basic and/or specific data stored in relation to the interchangeable lens, and the corrected image data are stored in an image data memory.

Advantages additionally accrue when the respectively determined basic lens data are stored as additional information in the image or in the image file (for example the header of an EXIF image file). The information in the image file can be used to produce in image processing programs profiles for image pickups with the aid of specific lenses that substantially simplify the subsequent processing. If the basic lens data are stored as additional information in the negative image of an analog camera, in a way similar to the known insertion of data codes, it is possible in a simple way to use these for image correction when producing the photopositive.

Of course, it is likewise possible also to carry out the method according to the invention with sensors that differ from light transmitter/light receiver sensors and are capable of detecting the specially prepared surface regions, assigned to them, on the locking apparatus, doing so in a contactless fashion and without exposed electrical contacts. For example, it will be possible to incorporate in the white or black lacquer particles that vary the magnetic property of the surface regions, and in this way enable detection of the coding with the aid of magnetic field sensors arranged in the support surface of the camera. An essential feature is the ease with which existing lenses can be retrofitted without complicated exposed electrical contacts.

An apparatus for carrying out the previously described method comprises a camera of a camera system with a support surface for mounting the locking apparatus of an interchangeable lens, in which the support surface has a latching lock as orientation mark, and a fixing device for the locking apparatus of the interchangeable lens and a region for attaching sensors for detecting codings provided on the locking apparatus is provided in the support surface in a fashion counter to the direction of rotation of the locking operation and at a spacing from the latching lock in an angle segment from 90° to 180°. Since the support surface is a component of a bayonet mount that is subjected to strong mechanical stresses and is fastened on the camera housing with the aid of a number of screws, but there is no possibility of attaching sensors in the region of screw connections, it has emerged as particularly advantageous to provide the region for attaching sensors at between 110° and 150°. An additional control sensor can, however, be provided at another site between the screw connections.

The sensor region has a cutout for holding a sensor array or a number of cutouts for holding individual sensors. In this way, the sensors can be arranged in a fashion protected against mechanical environmental influences and integrated in the support surface.

The sensor array can be designed as a printed circuit board to be inserted in a prefabricated fashion. In this case, for example, it is possible to arrange the light-transmitting and light-receiving elements with their electric connections on the rear side of the printed circuit board, and to connect optically conducting transmission lines upstream of these elements.

A particularly advantageous refinement of the sensors consists in respectively providing a light transmitter and a light receiver that are at a spacing from one another in a radial direction, the light transmitter being arranged in the vicinity of the outer edge of the support surface, and the light receiver being arranged in the vicinity of the inner edge of the circular support surface. Of course, it is also possible to arrange the light receiver in the vicinity of the outer edge of the support surface, and the light transmitter in the vicinity of the inner edge of the circular support surface. It is essential to have a good geometric alignment of the sensors by comparison with the respectively assigned reflecting and absorbing surfaces on the locking apparatus of the interchangeable lens. As to their areal extent, the reflecting and absorbing surfaces are advantageously larger than the sensor regions respectively assigned to them, in order to be able to compensate a possibly existing rotary play of the interchangeable lens in the latching lock connection, and thus to ensure successful detection.

The light transmitters and light receivers forming the sensor are protected by a light-guiding casting compound intended to protect against environmental influences. In order to prevent the direct guidance of light from the light transmitter to the light receiver a thin lightproof web is introduced between them.

In a particularly advantageous way, at least two, preferably six sensors are constructed in an equidistant arrangement as linear array. It is possible in this way for the lightproof web to be inserted into the already cast sensor array by a simple incision with the aid of a thin saw blade. The slot thereby produced is subsequently filled up with a lightproof casting compound that effectively prevents a direct guidance of light from the light transmitter to the light receiver. The arrangement of light transmitters and light receivers in a line next to one another in a fashion tangential to the circumference of the support surface is likewise possible, although it is then necessary to insert a number of radially designed lightproof webs in order to prevent crosstalk from the light guidance.

In a further advantageous embodiment, the sensors are arranged in such a way that they form reflected light barriers together with light-reflecting or light-absorbing surface regions on the locking apparatus of the interchangeable lens. This arrangement enables connected interchangeable lenses to be identified in a simple way, and requires few cost-effective components.

Of course, the application of the method is not limited to identifying interchangeable lenses of a camera system. Eyepieces or accessories of a telescope system, for example, can also be identified in a likewise advantageous way.

BRIEF DESCRIPTION OF THE DRAWINGS

The invention is described and explained in more detail below with the aid of an exemplary embodiment illustrated schematically in the drawing drawings, in which.

DETAILED DESCRIPTION

Figure 1:
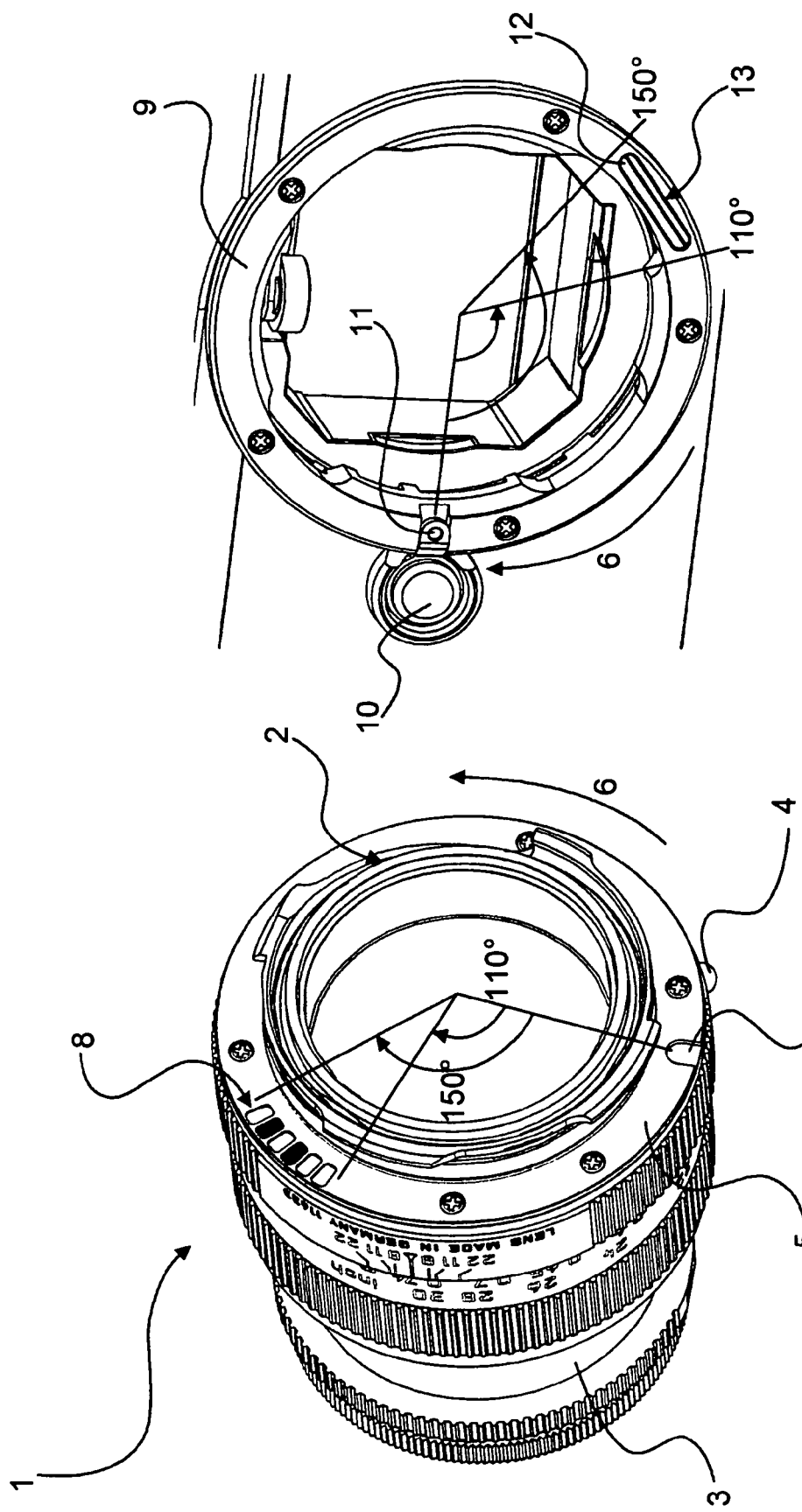
FIG. 1 shows a support surface of a camera with a sensor region and an interchangeable lens.

FIG. 1 illustrates an interchangeable lens 1 with a locking apparatus 2 and a lens housing 3. The lens housing 3 has an orientation mark 4. A latching depression 7 is located in a mounting surface 5 of the locking apparatus 2 of the interchangeable lens 1, being located in a fashion spaced apart from the orientation mark 4 counter to the direction of rotation, illustrated with the aid of an arrow 6, of the locking operation. Six reflecting and absorbing surfaces 8 lying separately next to one another are located on the mounting surface 5 in a fashion spaced apart once again from the latching depression 7 counter to the direction of rotation 6. The reflecting and absorbing surfaces 8 lie in an angle segment of preferably 110° to 150° counter to the direction of rotation of the locking operation 6 at a distance from the latching depression 7.

For the purpose of mounting the locking apparatus 2 of the interchangeable lens 1 correctly in terms of rotation on a support surface 9 of the camera (not illustrated in more detail), the orientation mark 4 is brought into correspondence with an actuating button 10 of a latching lock 11 arranged in the support surface 9. The support surface 5 of the interchangeable lens 1 and the support surface 9 of the camera are brought into contact by a movement that brings them together, and are interconnected by a rotation in the direction of rotation of the locking operation 6. After the locking operation has been performed, the latching lock 11 latches into the latching depression 7 and forms a rotationally secure connection that can be loosened again by pressing the actuating button 10.

Figure 5:
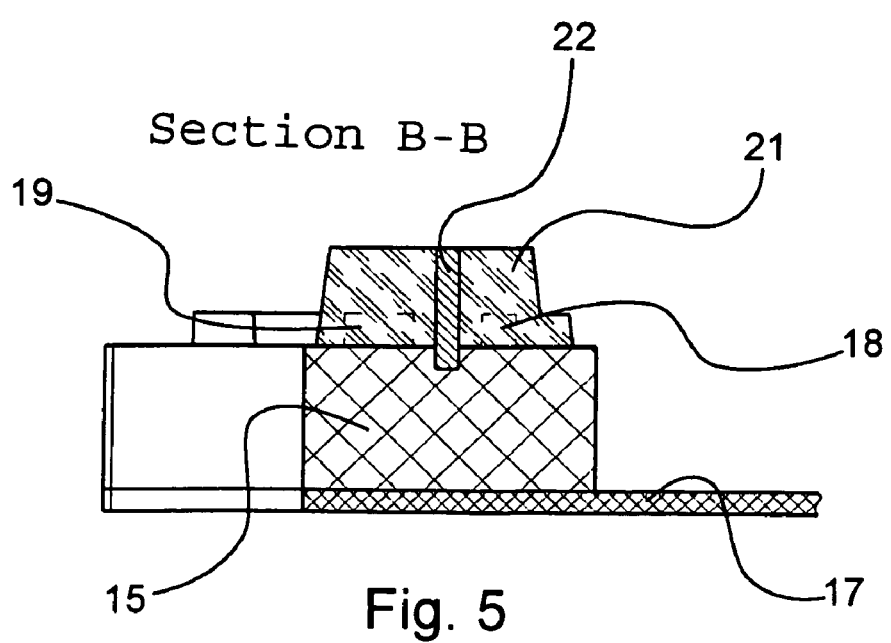
FIG. 5 shows a sectional illustration of the sensor carrier from FIG. 4.

A cutout 12 for a sensor region 13 is located in the support surface 9 in an angle range from preferably 110° to 150° in a fashion spaced apart from the latching lock 11 counter to the direction of rotation 6. A sensor array 14 illustrated in FIGS. 2 and 5 is arranged in the sensor region 13.

Figure 2:
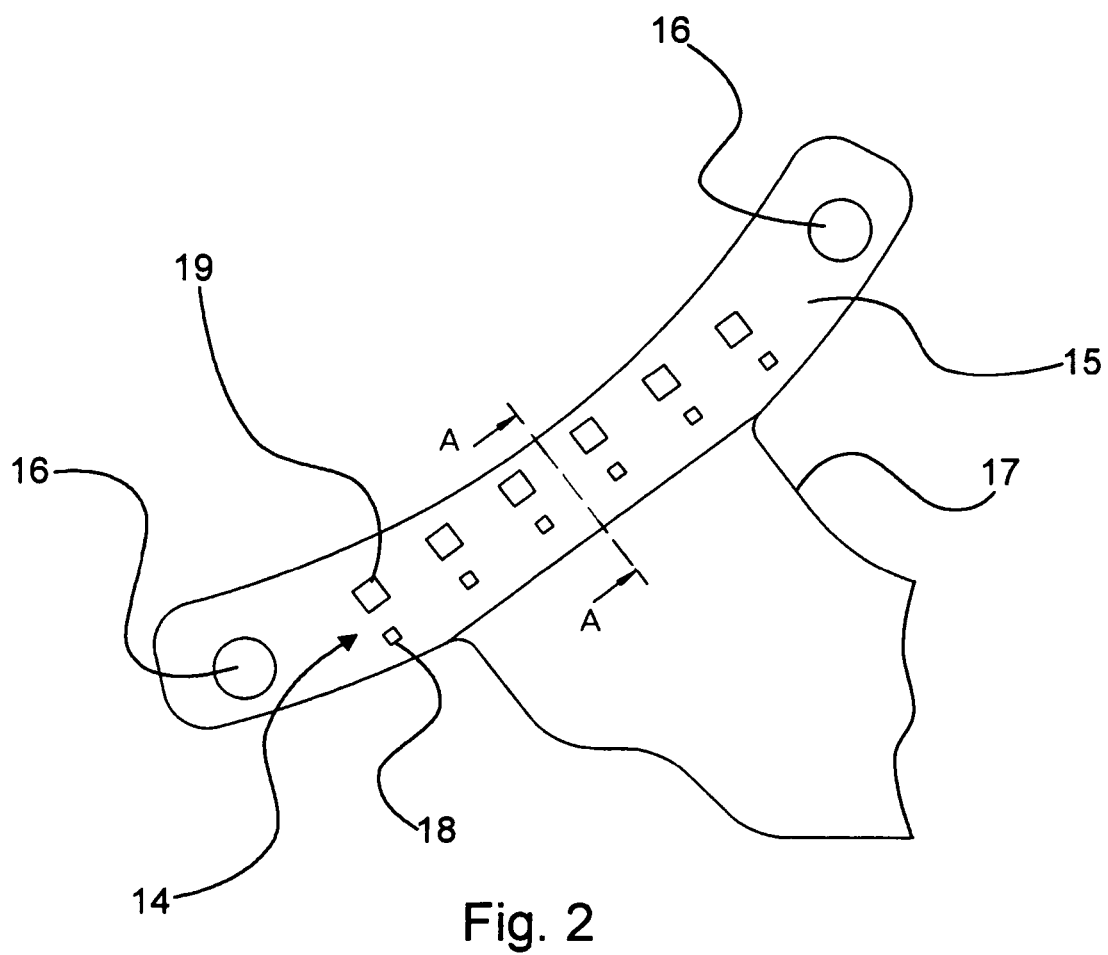
FIG. 2 shows a sensor carrier with an unprotected sensor array.

A sensor carrier 15, in the shape of a circular segment, for a sensor array 14 (illustrated in an unprotected fashion) is to be seen in FIG. 2. The sensor carrier 15 has fastening holes 16 at its two ends for mounting behind the support surface 9. Sensor signals can be forwarded to the camera electronics with the aid of a conductor strip 17 fitted on the sensor carrier 15. The sensor array 14 consists of six light transmitters 18 and six light receivers 19 assigned thereto.

Figure 3:
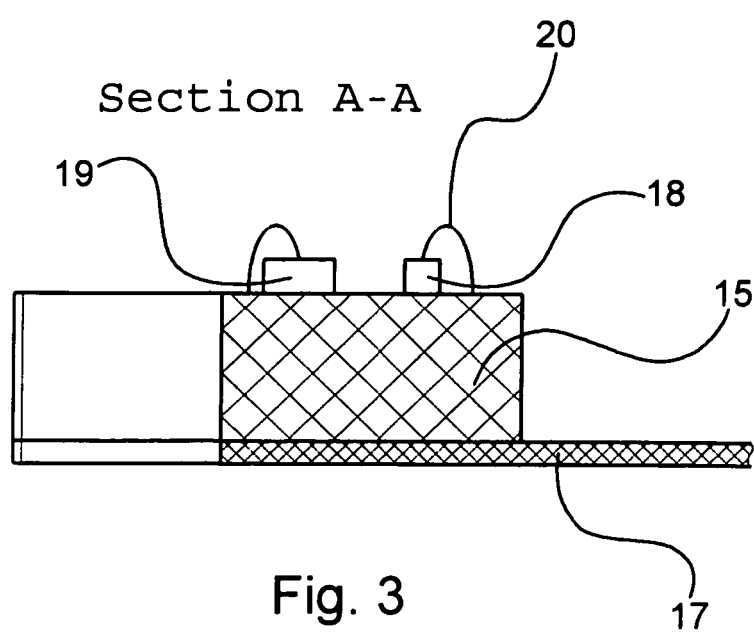
FIG. 3 shows a sectional illustration of the sensor carrier from FIG. 2.

In order to explain the arrangement of light transmitters 18 and light receivers 19, FIG. 3 shows a sectional illustration of the sensor carrier from FIG. 2 along the line in section A-A. In its upper region, the sensor carrier 15 has a light transmitter 18, illustrated in a small manner, and a light receiver 19, illustrated in a somewhat larger manner. Electric contact is made with the conductor strip 17 with the aid of contacting wires 20.

Figure 4:
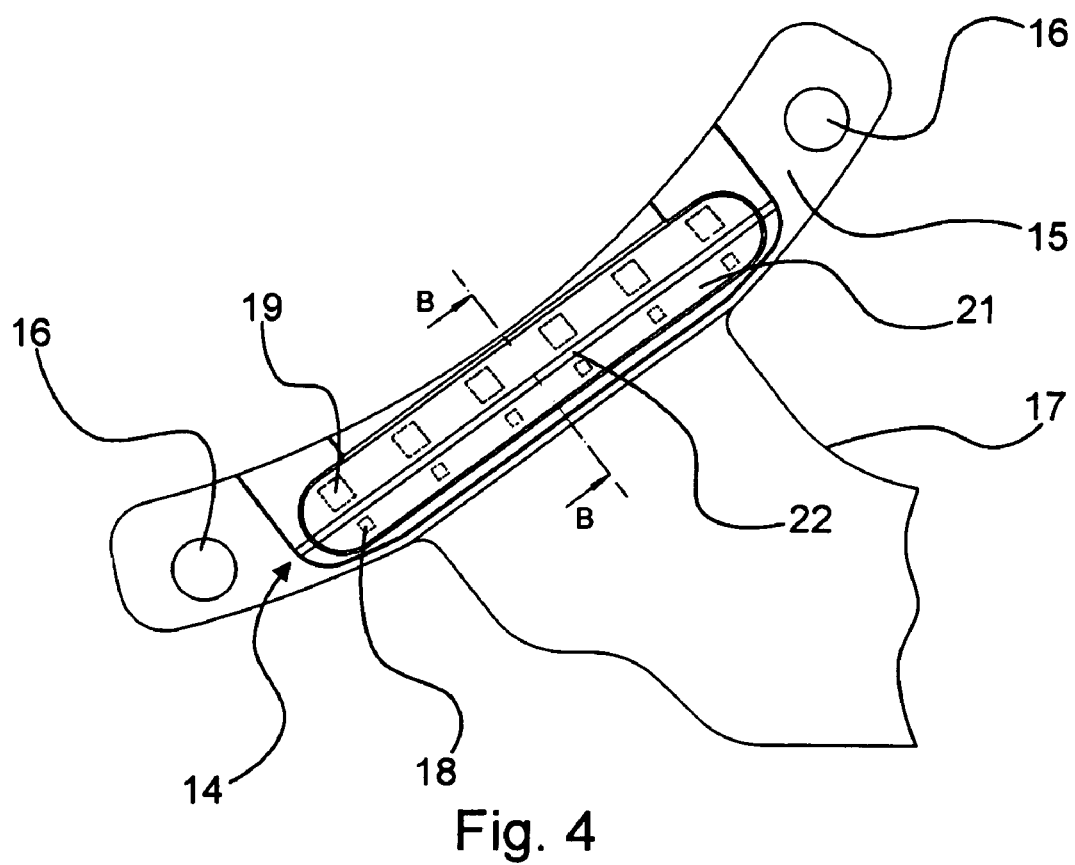
FIG. 4 shows a sensor carrier with a protected sensor array.

FIG. 4 shows a sensor carrier 15 with a sensor array 14 protected by a light-guiding casting compound 21. A thin lightproof web 22 for the optical separation of light transmitters 18 and light receivers 19 is introduced into the light-guiding casting compound 21.

FIG. 5 shows a sectional illustration of the protected sensor carrier 15 from FIG. 4 along the line of section B-B. The light transmitter 18 and light receiver 19 are indicated inside the light-guiding casting compound 21. Clearly to be seen is the lightproof web 22 that is introduced by the light-guiding casting compound 21 as far as into the sensor carrier 15 fastened on the conductor strip 17.

LIST OF REFERENCE NUMERALS

1 Interchangeable lens
2 Locking apparatus
3 Lens housing
4 Orientation mark
5 Mounting surface of the interchangeable lens
6 Direction of rotation of the locking operation
7 Latching depression
8 Reflecting and absorbing surfaces
9 Support surface of the camera
10 Actuating button
11 Latching lock 12 Cutout
13 Sensor region
14 Sensor array
15 Sensor carrier
16 Fastening holes
17 Conductor strip
18 Light transmitter
19 Light receiver
20 Contacting wire
21 Light-guiding casting compound
22 Lightproof web

The invention claimed is:

1. An apparatus for identifying an interchangeable lens, comprising:
the interchangeable lens with a locking apparatus, the interchangeable lens being connectable in a prescribed position to a support surface on a camera of a camera system using the locking apparatus, wherein, after a locking operation is performed, a defined optical radiation is directed from two or more light transmitters arranged in the support surface to reflecting or absorbing surfaces on the locking apparatus which are assigned to said light transmitters, wherein the radiation returning from the respective reflecting/absorbing surfaces is picked up by light receivers arranged next to the light transmitters in the support surface, wherein a binary coded signal for identifying the interchangeable lens is formed from output signals of the light receivers; and
the camera of the camera system with the support surface for mounting the locking apparatus of the interchangeable lens, in which the support surface has a latching lock as an orientation mark, and a fixing device for the locking apparatus of the interchangeable lens,
wherein a sensor region for attaching sensors for detecting codings provided on the locking apparatus is provided in the support surface in a fashion counter to a direction of rotation of the locking operation and at a spacing from the latching lock in an angle segment from 90° to 180°.

2. The apparatus as claimed in claim 1, wherein the sensor region has a cutout for holding a sensor array comprising the light transmitters and light receivers or a number of cutouts for holding individual sensors comprising one light transmitter and one light receiver.

3. The apparatus as claimed in claim 2, wherein, in each case, each light transmitter and its corresponding light receiver are at a spacing from one another in a radial direction,
each light transmitter being arranged in a vicinity of an outer edge of the support surface and its corresponding light receiver being arranged in a vicinity of an inner edge of the support surface, or vice versa.

4. The apparatus as claimed in claim 3, wherein the light transmitters and light receivers forming each sensor are protected by a light-guiding casting compound intended to protect against environmental influences, and
wherein, in order to prevent direct guidance of light from each light transmitter to its corresponding light receiver, a thin lightproof web is introduced between them.

5. The apparatus as claimed in claim 4, wherein six sensors are constructed in an equidistant arrangement as a linear array.

6. The apparatus as claimed in claim 5, wherein the sensors are arranged such that they form reflected light barrier sensors together with light-reflecting or light-absorbing surface regions on the locking apparatus of the interchangeable lens.

* * * * *